(12) United States Patent
Kuo

(10) Patent No.: US 8,869,064 B2
(45) Date of Patent: Oct. 21, 2014

(54) METHODS FOR DISPLAYING ICONS

(75) Inventor: Che-Jen Kuo, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 533 days.

(21) Appl. No.: 12/546,122

(22) Filed: Aug. 24, 2009

(65) Prior Publication Data

US 2010/0185980 A1 Jul. 22, 2010

(30) Foreign Application Priority Data

Jan. 21, 2009 (TW) ................................ 98102220 A

(51) Int. Cl.
*G06F 3/048* (2013.01)
*G06F 3/0481* (2013.01)
*H04M 1/725* (2006.01)

(52) U.S. Cl.
CPC ....... *G06F 3/04817* (2013.01); *H04M 1/72519* (2013.01)
USPC ........................................................ 715/810

(58) Field of Classification Search
USPC ............................ 715/788, 810, 837; 455/566
See application file for complete search history.

(56) References Cited

U.S. PATENT DOCUMENTS

| | | | | |
|---|---|---|---|---|
| 5,367,626 A * | 11/1994 | Morioka et al. | ............... | 715/837 |
| 6,621,508 B1 * | 9/2003 | Shiraishi et al. | ............... | 715/810 |
| 6,668,177 B2 * | 12/2003 | Salmimaa et al. | ............ | 455/566 |
| 6,907,276 B2 * | 6/2005 | Toba | ............... | 455/566 |
| 7,032,188 B2 * | 4/2006 | Salmimaa et al. | ............ | 715/864 |
| 7,681,128 B2 * | 3/2010 | Yamamoto et al. | ............ | 715/717 |
| 7,925,305 B2 * | 4/2011 | Honda | .......................... | 455/566 |
| 8,434,007 B2 * | 4/2013 | Morita | .......................... | 715/738 |
| 2001/0035881 A1 * | 11/2001 | Stoakley et al. | ............... | 345/772 |
| 2003/0045315 A1 * | 3/2003 | Vasa | ............................. | 455/517 |
| 2003/0083109 A1 * | 5/2003 | King et al. | ..................... | 455/566 |
| 2003/0119562 A1 * | 6/2003 | Kokubo | ........................ | 455/566 |
| 2004/0155907 A1 * | 8/2004 | Yamaguchi et al. | .......... | 345/810 |
| 2007/0018957 A1 * | 1/2007 | Seo | ................................. | 345/156 |
| 2007/0067734 A1 * | 3/2007 | Cunningham et al. | ........ | 715/779 |
| 2007/0186176 A1 * | 8/2007 | Godley | ......................... | 715/764 |
| 2008/0141172 A1 * | 6/2008 | Yamamoto et al. | .......... | 715/835 |
| 2008/0235602 A1 * | 9/2008 | Strauss et al. | ................ | 715/762 |
| 2009/0019385 A1 * | 1/2009 | Khatib et al. | ................. | 715/765 |
| 2009/0300539 A1 * | 12/2009 | Hendricks | ..................... | 715/779 |
| 2010/0077347 A1 * | 3/2010 | Kirtane et al. | ................ | 715/803 |
| 2010/0299606 A1 * | 11/2010 | Morita | .......................... | 715/738 |

FOREIGN PATENT DOCUMENTS

CN 101119560 A 2/2008

OTHER PUBLICATIONS

Chinese Office Action dated Jun. 4, 2013, 8 pages.

* cited by examiner

*Primary Examiner* — William Titcomb
(74) *Attorney, Agent, or Firm* — Edell, Shapiro & Finnan, LLC

(57) ABSTRACT

A method for displaying icons corresponding to various function statuses of an electronic device on a screen thereof is provided. The method includes providing the screen with a first display area and a second display area, the first display area capable of displaying a single icon, and the second display area capable of displaying a plurality of icons; selecting one icon of a first icon set to be displayed in the first display area of the screen; and selecting at least one icon of a second icon set to be displayed in the second display area.

11 Claims, 4 Drawing Sheets

| status types | type name | possible icons | description | priority | note |
|---|---|---|---|---|---|
| T₁ | network | HSDPA(HZ)/ HSDPA(RM)/ UMTS(HZ)/ UMTS(RM)/ EGPRS(HZ)/ EGPRS(RM)/ GPRS(HZ)/ GPRS(RM)/ GSM(HZ)/ GSM(RM)/ | network type that mobile phone is using | 1 | high priority |
| T₂ | user profile | default mode/ mute mode/ conference mode/ outdoor mode/ earphone mode | present user setting set | 1 | high priority |
| T₃ | supplementary service | line 1/ line 1 forward/ line 2/ line 2 forward | present line and status of forward service | 1 | middle priority |
| T₄ | in call | in call | in call | 1 | MP |
| T₅ | message status | SIM card message full | SIM card space for message is full | 1 | middle priority (MP) |
| | | phone message full | phone space for message is full | 2 | |
| | | new message | have new message | 3 | |
| | | new voicemail | have new voicemail | 4 | |
| | | unread message | have unread message | 5 | |
| | | receive/transmit message | R/T message | 6 | |
| T₆ | WAP network | WAP transmit | WAP function is being performed | 1 | middle priority |
| T₇ | other | memory access | access data from the memory | 1 | middle priority (MP) |
| | | perform media player | media player is being performed | 2 | |
| | | perform FM broadcasting | FM broadcasting is being performed | 3 | |
| | | USB connect | connect to a USB device | 4 | |

Fig. 1

| icon set | set name | status type in each set | priority of status type | number of display position |
|---|---|---|---|---|
| $S_1$ | network | network (T1) | 1 | 1 |
| $S_2$ | user profile | user profile (T2) | 1 | 1 |
| $S_3$ | supplementary service and in call | supplementary service (T3) | 2 | 1 |
| | | in call (T4) | 1 | |
| $S_4$ | message status and WAP network | message status (T5) | 2 | 2 |
| | | WAP network (T6) | 1 | |
| $S_5$ | other | other (T7) | 1 | 1 |

Fig. 2

METHODS FOR DISPLAYING ICONS

CROSS REFERENCE TO RELATED PATENT APPLICATION

This patent application is based on Taiwan, R.O.C. patent application No. 98102220 filed on Jan. 21, 2009.

FIELD OF THE INVENTION

The present invention relates to a mechanism for displaying icons, and more particularly, to an icons displaying method capable of quickly reflecting user requirements.

BACKGROUND OF THE INVENTION

Handheld products such as mobile phones need to process a large amount of data or programs, such as in connection with a short message service (SMS), a multimedia message service (MMS), an e-mail service, a web transmission, a phone call, a media player, a battery status, a Bluetooth service, an external storage device, a satellite navigation, a wireless network, and so on. In order to learn statuses of programs performed by a mobile phone, the foregoing programs are displayed on a status bar represented by an icon. A user is able to learn a specific status of the mobile phone when a corresponding program or icon is called out by pointing and clicking the icon. However, information of the foregoing program statuses may get too much for the rather too small status bar of a screen of the mobile phone to display. Therefore, it could become more and more difficult to display the icons corresponding to all of the program statuses on the status bar on the screen of the mobile phone to satisfy user requirements.

In a traditional icon display method, different functional properties correspond to different display positions of a status bar, and the display position corresponding to each of icons to be displayed is determined according to the functional property corresponding to each of the icons. Therefore, the icons corresponding to a same functional property are displayed on a same position, and which icon is to be displayed on the position depends on the time when the icons events occur. For example, when an icon of receiving a new voicemail message and an icon of receiving a new short message correspond to a same functional property (a message status), the icons will be displayed on a same position. When the event of receiving the new short message takes place, the icon of receiving the new short message is displayed on the position. Then, when the event of receiving the new voicemail message takes place, the same position is replaced by the icon of receiving the new voicemail message. However, the mobile phone may actually receive the new voicemail message immediately after receiving the new short message. In this regard, it is impractical that the user cannot be informed of the received new short message unless he operates the mobile phone to the message box.

SUMMARY OF THE INVENTION

Therefore, one object of the present invention is to provide a method for displaying icons. The method is capable of responding to user requirements quickly and effectively, so as to solve the problem mentioned above.

According to an embodiment of the present invention, a method for displaying icons is provided. The method for displaying candidate icons corresponding to a plurality of function statuses of an electronic device on a screen thereof, comprising: providing the screen with a first display area and a second display area, the first display area capable of displaying a single icon, and the second display area capable of displaying a plurality of icons; selecting one icon of first icon set to be displayed in the first display area of the screen; and selecting at least one icon of second icon set to be displayed in the second display area.

According to another embodiment of the present invention, a method for displaying icons is provided. The candidate icons correspond to a plurality of function statuses of an electronic device on a screen thereof, and are categorized into a plurality of icon sets comprising a first icon set and a second icon set. The method comprises: receiving a display request associated with one of the plurality of candidate icons; providing the screen with a first display area and a second display area, the first display area capable of displaying a single icon, and the second display area capable of displaying a plurality of icons; determining an icon set, among the plurality of icon sets, to which the associated icon belongs; determining whether a first available position exists in the first display area when the associated icon is determined to be one of the first icon set; determining whether a second available position exists in the second display area when the first icon is determined to be one of the second icon set; and displaying the associated icon on the first available position when the first available position exists and the associated icon is determined to be the one of the first icon set; and displaying the associated icon on the second available position when the second available position exists and the associated icon is determined to be the one of the second icon set.

As mentioned above, a user is able to learn a function status of a certain program of an electronic device via the foregoing steps without having to manually operate the electronic device to provide the user with practical convenience.

BRIEF DESCRIPTION OF THE DRAWINGS

FIG. 1 is a diagram of possible status types of a mobile phone and possible icons displayed on the mobile phone in accordance with an embodiment of the present invention.

FIG. 2 is a diagram of categorizing the icons illustrated in FIG. 1 into a plurality of icon sets.

DETAILED DESCRIPTION OF THE PREFERRED EMBODIMENT

Figure 3:
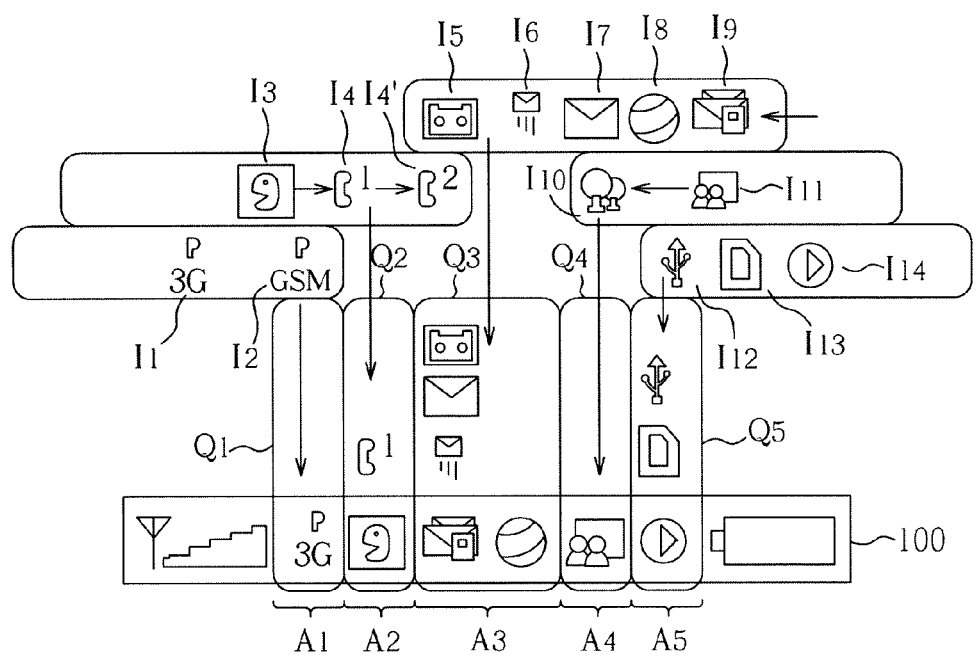
FIG. 3 is a schematic diagram of displaying icons to be displayed on a status bar according to icon sets $S_1$ to $S_5$ illustrated in FIG. 2.

According to an embodiment of the present invention, a method for categorizing candidate icons corresponding to various programs and status types of functions of an electronic device such as a mobile phone is provided. The candidate icons are categorized into various icon sets according to a user-defined criterion, an importance level of functional properties or a system-defined criterion, and different priorities are assigned to the icons in the icon sets. Display areas, of a status bar on the screen of the electronic device, corresponding to the various icon sets having been categorized, are ordered according to the different priorities of the icons, so as to determine the icons to be displayed. In general, with the method according to the present invention, all possible status types to be displayed on the status bar shall be first listed, and then all possible icons of each of the status types are listed to determine the display priorities of the icons. Next, the status types are categorized into different icon sets according to a user-defined criteria or an icon importance level. After the icons, of the status types, contained in each of the icon sets has been determined, different display priorities are assigned to the icons in the icons sets. At this point, the number of display areas capable of displaying each of the icon sets on the status bar is determined; that is, the number of icons, of each icon sets, that can be displayed is determined.

The following description is provided to gain a better understanding of the foregoing flow, and is not meant to limit the invention thereto. FIG. 1 shows possible status types of a mobile phone and possible icons to be displayed on the screen of the mobile phone in accordance with an embodiment of the present invention. FIG. 2 shows a table of the icons, illustrated in FIG. 1, being categorized into a plurality of icon sets. Seven different status types are illustrated in FIG. 1. A network status type $T_1$ and a user profile status type $T_2$ are more important status types; a supplementary service status type $T_3$, an in-call status type $T_4$, a message status type $T_5$, a Wireless Application Protocol (WAP) network status type $T_6$ and other status types $T_7$ are less important status types. The network status type $T_1$ and the user profile status type $T_2$ are preferably displayed on the status bar at all times. Therefore, it is designed that icon display positions on the status bar are reserved for displaying icons of the network status type $T_1$ and the user profile status type $T_2$. The less importance status types $T_3$ to $T_7$ do not need to be displayed on the status bar at all times such that icons corresponding to the status types $T_3$ to $T_7$ shall be re-categorized. For example, referring to FIG. 2, icons corresponding to the supplementary service status type $T_3$ and the in-call status type $T_4$ are combined to an icon set $S_3$, and the message status type $T_5$ and the WAP network status type $T_6$ are combined to an icon set $S_4$. Icons within five icon sets $S_1$ to $S_5$ are assigned priorities. For example, icons corresponding to the in-call status type $T_4$ have a higher priority than icons corresponding to the supplementary service status type $T_3$, and icons corresponding to the WAP network $T_6$ have a higher priority than icons corresponding to the message status type $T_5$.

In addition, in an example illustrated in FIG. 2, two icon display positions are given to the icon set S4 formed by the message status type $T_5$ and the WAP network status type $T_6$. In this embodiment, suppose that the status bar has six icon display positions. FIG. 3 shows a schematic diagram of displaying icons to be displayed on a status bar 100 according to the icon sets $S_1$ to $S_5$ illustrated in FIG. 2. The status bar 100 has display areas $A_1$ to $A_5$. The display area $A_3$ has two icon display positions, and each of the other display areas $A_1$, $A_2$, $A_4$ and $A_5$ has only one icon display position, respectively. That is, the status bar 100 is divided into at least a first display area such as $A_1$, $A_2$, $A_4$ or $A_5$ and at least a second display area such as $A_3$. The first display area has one icon display position and the second display area has a plurality of icon display positions. It is to be noted that, the display areas $A_1$ to $A_5$ do not respectively correspond to the icon sets $S_1$ to $S_5$ illustrated in FIG. 2. Detailed description of the display areas $A_1$ to $A_5$ and the icon sets $S_1$ to $S_5$ is provided below. With respect to the display area $A_1$ having only one icon display position, an icon from the icon set S1 having the network status type $T_1$ icons is displayed in the display area $A_1$ according to a current network type of a mobile phone. For example, when the mobile phone utilizes a third generation (3G) network, a 3G network icon $I_1$ is displayed in the display area $A_1$, as shown in FIG. 3. Alternatively, when the mobile phone changes to utilize a global system for mobile communication (GSM) network, a GSM network icon $I_2$ is displayed in the display area $A_1$ to replace the 3G network icon $I_1$. In addition, the display area $A_2$ is used for displaying icons from the icon set $S_3$, and the icons may be an in-call icon $I_3$, and a line 1 and line 2 icons $I_4$ and $I_4'$. In this embodiment, since the user selects to utilize line 1, an icon queue $Q_2$ of the display area $A_2$ stores the in-call icon $I_3$ and the line 1 icon $I_4$. The icons stored in the icon queue $Q_2$ represent functions that the mobile phone is correspondingly performing. In other words, not all icons of the supplementary service status type $T_3$ and the in-call status type $T_4$ in the icon set $S_3$ are temporarily stored in the icon queue $Q_2$, but only the icons corresponding to the functions currently being performed by the mobile phone are temporarily stored in the icon queue $Q_2$. Since the display area $A_2$ has only one icon display position, one of the icons $I_3$ and $I_4$ is displayed in the display area $A_2$. Referring to FIG. 2, the priority of the status type (the in-call status type $T_4$) corresponding to the icon $I_3$ is higher than that of the status type (the supplementary service status type $T_3$) corresponding to the icons $I_4$. Therefore, the mobile phone displays the icon $I_3$ in the display area $A_2$.

In addition, an icon queue $Q_3$ corresponding to the display area $A_3$ temporarily stores five icons $I_5$ to $I_9$. The five icons $I_5$ to $I_9$ respectively represent a receiving and transmitting message icon, a new message icon, an unread message icon, a WAP network icon and a SIM card message full icon. Referring to FIG. 1 and FIG. 2, the icons $I_5$ to $I_9$ belong to the icon set $S_4$. The status type (the WAP network icon $T_6$) corresponding to the icon $I_8$ has a higher priority than the status type (the message status type $T_5$) corresponding to the icons $I_5$ to $I_7$ and $I_9$. Note that the display area $A_3$ has two display positions, the WAP network status type $T_6$ has a higher priority than the message status type $T_5$ (shown in FIG. 2), and the SIM card message full icon $I_9$ has a highest priority in the message status type $T_5$ (as shown in FIG. 1). Therefore, the icons $I_8$ and $I_9$ are displayed in the display area $A_3$ (as shown in FIG. 3). After a period of time, when the WAP network function is disabled, the icon $I_8$ representing the WAP network status type on the status bar is removed, and the new message icon $I_6$ is displayed in the display area $A_3$. Moreover, the icons displayed in the display area $A_4$ belong to the icon set $S_2$ and are associated with the user's setting. For example, the icon set $S_2$ contains an outdoor mode icon $I_{10}$ corresponding to an outdoor mode and a conference mode icon $I_{11}$ corresponding to a conference mode. When the mobile phone is set in a conference mode, the conference mode icon $I_{11}$ is selected and temporarily stored in an icon queue $Q_4$, and then displayed in the display area $A_4$ (shown in FIG. 3). When the mobile phone is changed to the outdoor mode, the conference mode icon $I_{11}$ is removed, the outdoor mode icon $I_{10}$ in the icon set $S_2$ is selected and displayed in the display area $A_4$. In addition, the icon set $S_5$ having other status type $T_7$ has three icons $I_{12}$, $I_{13}$ and $I_{14}$ to be displayed on the status bar 100. The icons $I_{12}$, $I_{13}$ and $I_{14}$ are respectively a USB connection icon, an FM broadcasting icon and a media player icon to be displayed on the status bar 100. The icons $I_{12}$, $I_{13}$ and $I_{14}$ are selected from the icon set $S_5$ and temporarily stored into an icon queue $Q_5$ corresponding to the display area $A_5$ having only one icon display position. Therefore, according to the priorities (shown in FIG. 1) of different icons of the status type $T_7$, the icon $I_{14}$ representing performing a media player function shall be displayed in the display area $A_5$.

As mentioned above, a user is able to learn a function status of a current program of an electronic device via the foregoing steps without having to manually operate the electronic device. For example, once the WAP network function of a mobile phone is performed, the user can observe the icon $I_8$ representing the WAP network function in a display area of the status bar 100. Therefore, it is convenient for the user to learn that the WAP network function is performed.

With respect to the display area $A_1$, when an icon such as the icon $I_1$ representing the 3G network, is determined to be displayed, the mobile phone displays the icon $I_1$ in an icon display position within the display area $A_1$ of the status bar 100. The display area $A_1$ only comprises the icon display position. In addition, with respect to the display area $A_3$, the mobile phone temporarily stores the icons $I_5$ to $I_9$ into an icon queue, selects the icons ($I_8$ and $I_9$) to be displayed according to the priorities of the status types corresponding to the icons $I_5$ to $I_9$ and the priorities of different icons of a same status type, and displays the icons $I_8$ and $I_9$ on two icon display positions of the display area $A_3$ of the status bar 100.

Furthermore, the user may always check whether the mobile phone uses the 3G network or the GSM network. Therefore, in the foregoing examples, referring to FIG. 1 and FIG. 2, it is defined that the functional property of the network status type $T_1$ is more important than that of the supplementary service status type $T_3$ or the in-call status type $T_4$. Accordingly, the icons corresponding to the network status type $T_1$ are categorized as the icon set $S_1$ which is assigned with a specialized display area $A_1$, such that the user is able to learn a current network status type at all times. However, the design for offering such user convenience shall not be construed as limiting the invention. It is to be noted that, the icon set $S_1$ only comprises icons associated with the network status type $T_1$, and the icon set $S_3$ comprises icons associated with the supplementary service status type $T_3$ and the in-call status type $T_4$. Therefore, the icons from the icon set $S_1$ correspond to a same functional property, and the icons from the icon set $S_3$ correspond to functional properties of at least two kinds of different status types.

In addition, the tables of FIG. 1 and FIG. 2 illustrate one of the examples of classifying icons to be displayed into different icon sets in accordance with an embodiment of the present invention; however, it shall not be construed as limiting. The different icon sets as categorized and the priorities of the icons from the icon sets can be adjusted according to a user's operating habits. Therefore, the method according to the embodiment of the present invention achieves the object of immediately responding to user requirements.

Figure 4:
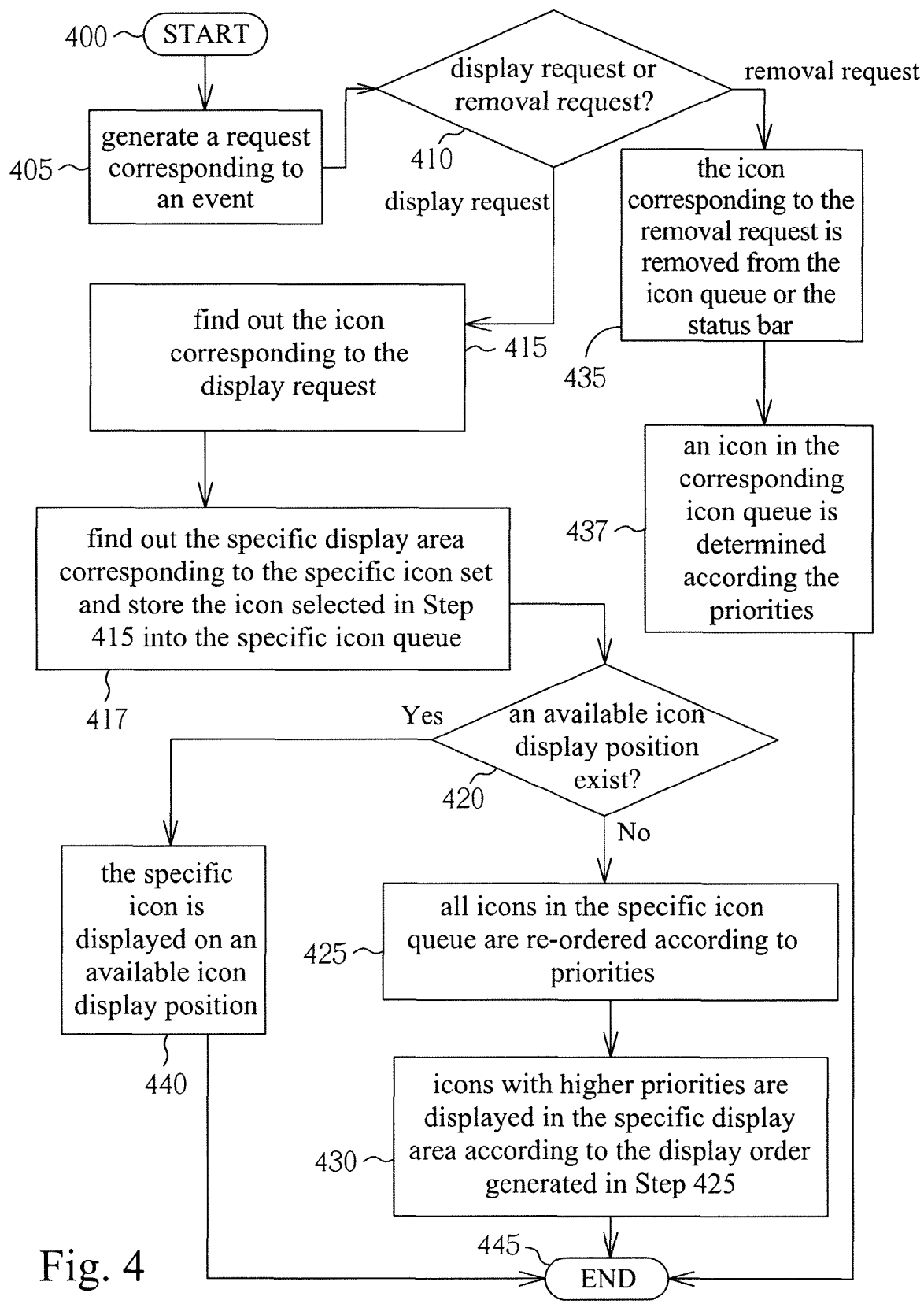
FIG. 4 is a flow chart of a method according to an embodiment of the present invention.

According to one embodiment of the present invention, a processing method when a display request corresponding to a specific icon is received is provided. FIG. 4 shows a flowchart of the method provided according to one embodiment of the present invention. Note that the following flow takes receiving a new short message by a mobile phone as an example. However, it shall not be construed as limiting. With appropriate adjustments or modifications, the flow may also be applied to icons corresponding to other functions of the mobile phone. Detailed Steps are Described Below.

The method begins with Step 400. In Step 405, a request corresponding to an event of a function operation of an electronic device is generated. For example, when the mobile phone receives a new message, a request corresponding to the event of receiving the new message is generated. In Step 410, whether the request is a status display request or a status removal request is determined. When the request is determined as a status display request, Step 415 is performed; otherwise, when the request is determined as a status removal request, Step 435 is performed. In Step 415, determining a specific icon set, among the icon sets $S_1$ to $S_5$, to which an icon corresponding to the status display request belongs is performed, and then the icon corresponding to the status display request is selected from the specific icon set. In Step 417, in the status bar 100, a specific display area corresponding to the specific icon set is found, and the icon selected in Step 415 is temporarily stored into a specific icon queue corresponding to the specific display area. In Step 420, whether an available icon display position exists in the specific display area is determined. When the answer of Step 420 is yes, Step 440 is performed; otherwise, Step 425 is performed. In Step 425, all icons, temporarily stored in the specific icon queue, comprising the icon as selected in Step 415, are re-ordered according to priorities of the icons, so as to determine the display order of the icons. In Step 430, icons having higher priorities are displayed in the specific display area according to the display order generated in Step 425. In Step 435, to which specific icon set, among icon sets $S_1$ to $S_5$, an icon corresponding to the status removal request belongs is determined, and the icon corresponding to the status removal request is removed from the icon queue or the status bar associated with the specific icon set. In Step 437, an icon in the corresponding icon queue is determined according the priorities, and is displayed in the specific display area. In Step 440, the specific icon is displayed on an available icon display position of the specific display area of the status bar 100. The method ends with Step 445.

Receiving a new message by a mobile phone is now taken as an example. In Step 410, the request is determined as a status display request. Therefore, Step 415 is performed. In Step 415, an icon $I_6$ corresponding to the status display request is determined as belonging to the icon set $S_4$ and is selected from the icon set $S_4$. In Step 417, the display area $A_3$ shown in FIG. 3 is found on the status bar 100, and the icon $I_6$ is temporarily stored in the icon queue $Q_3$ corresponding to the display area $A_3$. In Step 420, whether the display area $A_3$ has available icon display position for displaying icon $I_6$ is determined. For example, when the answer of Step 420 is yes, Step 440 is performed; otherwise, Step 425 is performed. In Step 440, the icon $I_6$ is directly displayed on an available display position in the display area $A_3$. In Step 425, all icons, stored in the icon queue $Q_3$, comprising the icon $I_6$, are re-ordered according to priorities of the icons to determine display order of the icons. In Step 430, icons having higher display priorities are displayed in the specific display area according to the display orders generated in Step 425 and the icon display positions (two icon display positions) contained in the specific display area. In Step 430, when the icon $I_6$ has a higher priority than any icon originally displayed in the display area $A_3$, the icon $I_6$ replaces one originally displayed icon and is displayed in the display area $A_3$. On the contrary, when the icon $I_6$ has a lower priority, the icon $I_6$ does not replace the icon and is temporarily stored into the icon queue corresponding to the display area $A_3$.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for displaying candidate icons corresponding to a plurality of function statuses of an electronic device on a screen thereof, comprising:

providing the screen with a first display area and a second display area, the first display area configured to display a single icon at a time, and the second display area configured to display a plurality of icons at a time;

selecting one icon of a first icon set to be displayed in the first display area of the screen, wherein the first display area is specifically reserved for displaying the one icon of the first icon set;
selecting at least one icon of a second icon set to be displayed in the second display area, wherein the second display area is specifically reserved for displaying the at least one icon of the second icon set;
categorizing the candidate icons into a plurality of icon sets comprising the first icon set and the second icon set;
providing a priority for each icon of the first icon set, and providing a priority for each icon of the second icon set; and
maintaining a first queue of icons including icons from the first set of icons that correspond to functions currently being performed by the electronic device, and a second queue of icons including icons from the second set of icons that correspond to functions currently being performed by the electronic device, where an order of the icons in the first and second queues is determined by the priority provided to the respective icons in the first and second queues, wherein when the one icon of the first icon set is being displayed, a second icon of the first icon set is stored in the first queue without being displayed, and when the one icon of the second icon set is being displayed, a second icon of the second icon set is stored in the second queue without being displayed,
wherein the one icon of the first icon set and the at least one icon of the second icon set are selected from the first queue of icons and from the second queue of icons, respectively, and
wherein the first display area and the second display area are within a status bar.

2. The method as claimed in claim 1, wherein the selected icon of the first icon set is selected according to the priorities of the icons of the first icon set, and the selected at least one icon of the second icon set is selected according to the priorities of the icons of the second icon set.

3. The method as claimed in claim 1, wherein each of the candidate icons is categorized according to its functional property.

4. The method as claimed in claim 3, wherein icons in the first icon set have a same functional property, and icons in the second icon set have at least two kinds of functional properties.

5. The method as claimed in claim 1, wherein the candidate icons are categorized into the plurality icon sets according to a user-defined criterion.

6. A method for displaying candidate icons corresponding to a plurality of function statuses of an electronic device on a screen thereof, the candidate icons being categorized into a plurality of icon sets comprising a first icon set and a second icon set, the method comprising:
providing a priority for each icon of the first icon set, and providing a priority for each icon of the second icon set
receiving a display request associated with one of the plurality of candidate icons;
providing the screen with a first display area and a second display area, the first display area configured to display a single icon, and the second display area configured to display a plurality of icons, wherein the first display area and the second display area are within a status bar;
determining an icon set, among the plurality of icon sets, to which the associated icon belongs;
determining whether a first available position exists in the first display area when the associated icon is determined to be one of the first icon set, wherein the first display area is specifically reserved for displaying an icon from the first icon set;
determining whether a second available position exists in the second display area when the first icon is determined to be one of the second icon set, wherein the second display area is specifically reserved for displaying icons from the second icon set;
displaying the associated icon in the first available position when the first available position exists and the associated icon is determined to be the one of the first icon set; and
displaying the associated icon in the second available position when the second available position exists and the associated icon is determined to be the one of the second icon set; and
maintaining a first queue of icons including icons from the first set of icons that correspond to functions currently being performed by the electronic device, and a second queue of icons including icons from the second set of icons that correspond to functions currently being performed by the electronic device, where an order of the icons in the first and second queues is determined by the priority provided to the respective icons in the first and second queues, wherein when displaying the associated icon in the first available position, another icon in the first set of icons is stored in the first queue without being displayed, and when displaying the associated icon in the second available position, another icon in the second set of icons is stored in the second queue without being displayed,
wherein the associated icon of the first icon set and the associated icon of the second icon set are selected from the first queue of icons and from the second queue of icons, respectively.

7. The method as claimed in claim 6, further comprising:
determining whether a priority of the associated icon is higher than that of one first displayed icon in the first display area when the first available position is absent and the associated icon is determined to be the one of the first icon set, so as to determine whether to replace the first displayed icon with the associated icon.

8. The method as claimed in claim 6, further comprising:
storing the associated icon into the first queue corresponding to the first display area when the first available position is absent and the associated icon is determined to be the one of the first icon set.

9. The method as claimed in claim 6, further comprising:
determining whether a priority of the associated icon is higher than that of one second displayed icon in the second display area when the second available position is absent and the associated icon is determined to be the one of the second icon set, so as to determine whether to replace the second displayed icon with the associated icon.

10. The method as claimed in claim 9, further comprising:
storing the associated icon into the second queue corresponding to the second display area when the second available position is absent and the associated icon is determined to be the one of the second icon set.

11. The method as claimed in claim 6, wherein icons in the first icon set have a same functional property, and icons in the second icon set have at least two kinds of functional properties.

* * * * *